(12) United States Patent
Tanase et al.

(10) Patent No.: US 7,113,544 B2
(45) Date of Patent: Sep. 26, 2006

(54) MOTION DETECTING DEVICE

(75) Inventors: Susumu Tanase, Kadoma (JP); Akihiro Maenaka, Kadoma (JP)

(73) Assignee: Sanyo Electric Co., Ltd., Osaka (JP)

( * ) Notice: Subject to any disclaimer, the term of this patent is extended or adjusted under 35 U.S.C. 154(b) by 673 days.

(21) Appl. No.: 09/906,151

(22) Filed: Jul. 17, 2001

(65) Prior Publication Data

US 2002/0012393 A1    Jan. 31, 2002

(30) Foreign Application Priority Data

Jul. 17, 2000    (JP)    ............... 2000-216508

(51) Int. Cl.
H04N 7/12    (2006.01)
(52) U.S. Cl. ............... 375/240.16
(58) Field of Classification Search ............ 348/701; 375/240.26, 240.16; 382/236, 239, 270
See application file for complete search history.

(56) References Cited

U.S. PATENT DOCUMENTS

| | | | |
|---|---|---|---|
| 4,924,305 A * | 5/1990 | Nakagawa et al. | 348/451 |
| 5,668,609 A * | 9/1997 | Dunbar et al. | 348/700 |
| 6,421,090 B1 * | 7/2002 | Jiang et al. | 348/452 |
| 6,442,203 B1 * | 8/2002 | Demos | 375/240.16 |
| 6,452,972 B1 * | 9/2002 | Ohara | 375/240.12 |
| 6,459,734 B1 * | 10/2002 | Kato et al. | 375/240.12 |

FOREIGN PATENT DOCUMENTS

| | | |
|---|---|---|
| EP | 0 763 933 A2 | 3/1997 |
| EP | 0830 018 A2 | 3/1998 |
| JP | 11110565 | 4/1999 |

OTHER PUBLICATIONS

Koivunen, "Motion Detection of an Interlaced Video Signal", IEEE Transactions on Consumer Electronics, vol. 40, No. 3, pp. 753-759 (1994).

* cited by examiner

Primary Examiner—Mehrdad Dastouri
Assistant Examiner—Dave Czekaj
(74) Attorney, Agent, or Firm—Arent Fox PLLC (57) ABSTRACT

In a motion detecting device, with respect to a target pixel for which detection of motion is going to be performed, the threshold value to be used by comparator circuits 9 and 10 is varied based on the difference of image data between two pixels vertically adjacent to the target pixel. The comparator circuit 9 compares the difference, between two fields, of the image data of the target pixel with the threshold value, and the comparator circuit 10 compares the differences, between two fields, of the image data of the two pixels vertically adjacent to the target pixel with the threshold value. An adder circuit 12 adds together the comparison results with weights assigned thereto, and the detection of motion is performed based on the resulting sum.

7 Claims, 3 Drawing Sheets

MOTION DETECTING DEVICE

BACKGROUND OF THE INVENTION

1. Field of the Invention

The present invention relates to a motion detecting device for detecting the motion of a subject that is reproduced from field to field as a motion picture is played back.

2. Description of the Prior Art

In interlaced scanning, a picture is shot by performing image sensing alternately in the pixels in even-numbered lines and in the pixels in odd-numbered lines for each field of the picture. Thus, when such a picture shot by interlaced scanning is played back, it is necessary to interpolate the image data for those pixels to which no image data is allotted in a given field. One method of interpolating image data for pixels to which no image data is allotted is spatial interpolation whereby interpolation is achieved using the image data of a plurality of pixels nearby, and another is temporal interpolation whereby interpolation is achieved using the image data of identical pixels among a plurality of fields before and after the one currently being reproduced.

Whether to rely on spatial or temporal interpolation to interpolate necessary image data is decided by detecting the motion of a subject in the picture. Specifically, spatial interpolation is used to interpolate image data for pixels that are sensing a subject in motion, and temporal interpolation is used to interpolate image data for pixels that are sensing a motionless subject. In this way, by switching interpolation methods according to the state of motion of the subject being sensed by individual pixels, it is possible to faithfully reproduce the sensed subject in each field of the picture being played back.

Conventionally, such detection of motion is achieved by calculating differences of the image data of identical pixels among even-numbered and odd-numbered fields, and then comparing those differences with a predetermined threshold value. Specifically, to detect the motion of a subject that is being sensed by the pixels for which image data is going to be interpolated, the differences between the image data obtained from those pixels one field before and the image data obtained from the same pixels three fields before are compared with a predetermined threshold value, and, if the differences are greater than the threshold value, the subject being sensed by the pixels in question is recognized to be in motion.

In this way, by comparing the field-to-field differences of the image data of identical pixels with a predetermined threshold value, whether the subject being sensed by the pixels for which image data is going to be interpolated is in motion or not is judged. However, as long as such a threshold level is kept constant, for example, in a case where motion was present up to the field immediately previous to the one currently being reproduced but no motion is present any more in the current field, the motion that had been recognized just up to the previous field leads to an erroneous judgment that the motion is still present in the current field. In this case, although the image data of adjacent pixels now have nearly equal values and therefore spatial interpolation is appropriate, in fact temporal interpolation is performed. This makes faithful reproduction of the real image impossible, and sometimes causes flickering or the like while a motion picture is being played back.

SUMMARY OF THE INVENTION

An object of the present invention is to provide a motion detecting device that offers higher detection accuracy by the use of the image data of pixels around those in which motion is being detected.

To achieve the above object, according to the present invention, a motion detecting device is provided with: a threshold value control circuit that determines, with respect to a first pixel for which detection of motion is going to be performed, a threshold value based on the difference of image data between a second pixel and a third pixel that are arranged in the lines immediately above and below the line in which the first pixel is arranged and that are adjacent to the first pixel; and a motion detecting circuit that checks whether motion is present at the first pixel or not based on the results obtained by comparing the difference, between two fields, of the image data of each of the first, second, and third pixels with the threshold value. Here, as image data constituting one field after another, the image data of the pixels arranged in even-numbered lines and the image data of the pixels arranged in odd-numbered lines is fed in alternately, and whether a subject is in motion or not is checked at each of the pixels to which no image data is allotted in a given field.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

First Embodiment

Figure 1:
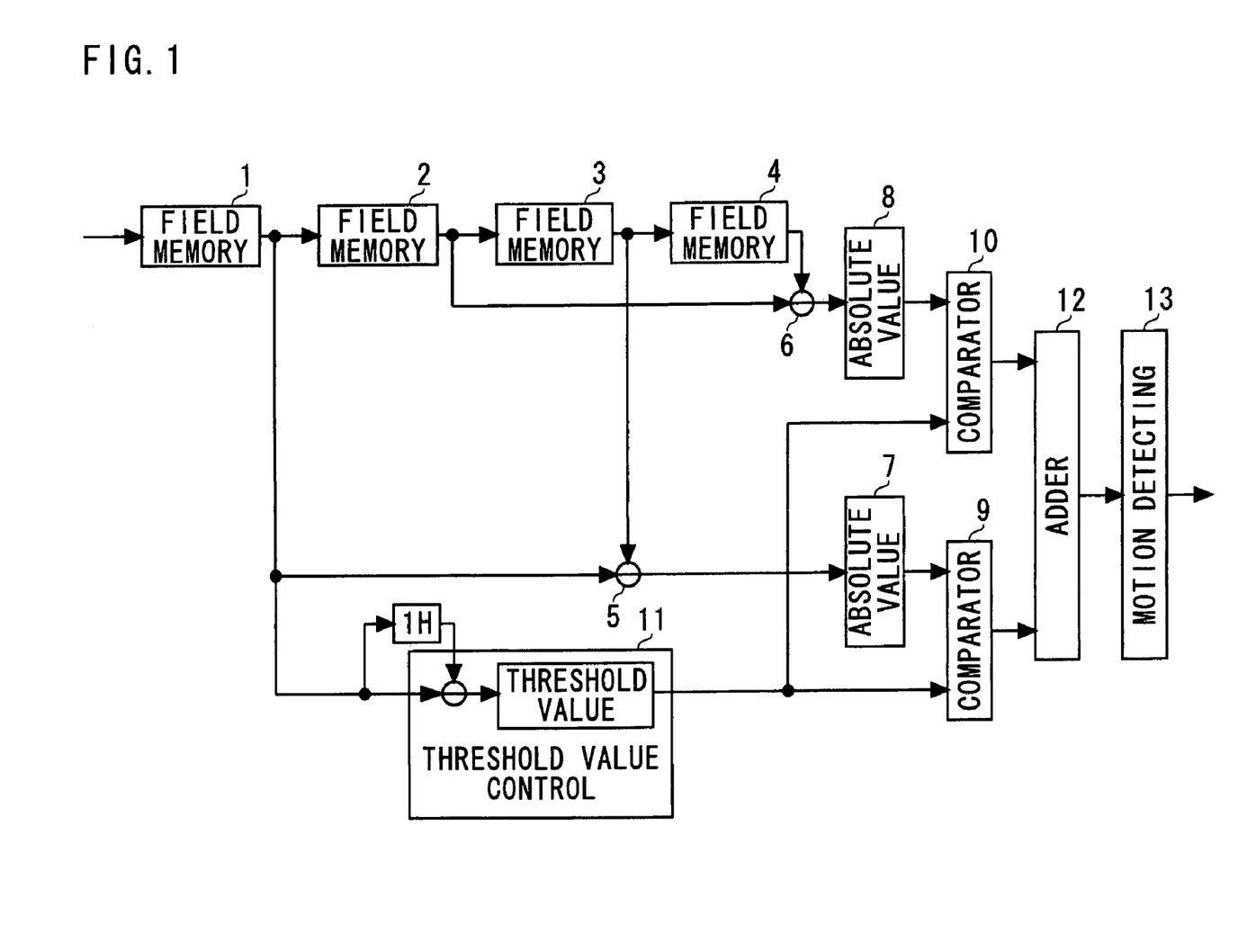
FIG. 1 is a block diagram showing the internal configuration of the motion detecting device of a first embodiment of the invention.

A first embodiment of the present invention will be described below with reference to the drawings. FIG. 1 is a block diagram showing the internal configuration of the motion detecting device of this embodiment.

The motion detecting device shown in FIG. 1 has field memories 1, 2, 3, and 4 each for storing image data constituting one field; a subtractor circuit 5 for calculating the differences between the image data of identical pixels output from the field memories 1 and 3; a subtractor circuit 6 for calculating the differences between the image data of identical pixels output from the field memories 2 and 4; absolute value calculator circuits 7 and 8 for calculating the absolute values of the outputs from the subtractor circuits 5 and 6, respectively; comparator circuits 9 and 10 for comparing the outputs from the absolute value calculator circuits 7 and 8, respectively, with a threshold value set by a threshold value control circuit 11; a threshold value control circuit 11 for controlling the threshold value according to the image data fed from the field memory 1; an adder circuit 12 for adding together the outputs from the comparator circuits 9 and 10 with weights assigned thereto; and a motion detecting circuit 13 for detecting motion in the output from the adder circuit 12.

In this motion detecting device, when image data constituting one field is fed in, it is stored in the field memory 1. The image data constituting one field stored in the field memory 1 is then fed to the field memory 2, to the subtractor circuit 5, and to the threshold value control circuit 11. The image data constituting one field stored in the field memory 2 is then fed to the field memory 3 and to the subtractor circuit 6. The image data constituting one field stored in the field memory 3 is then fed to the field memory 4 and to the subtractor circuit 5. The image data constituting one field stored in the field memory 4 is then fed to the subtractor circuit 6.

Thus, in the field memory 1 is stored the image data of the current field in which detection of motion is going to be performed (hereinafter, this field will be referred to as the "first field"). In the field memory 2 is stored the image data of the field one field before the current field (hereinafter, this field will be referred to as the "second field"). In the field memory 3 is stored the image data of the field two fields before the current field (hereinafter, this field will be referred to as the "third field"). In the field memory 4 is stored the image data of the field three fields before the current field (hereinafter, this field will be referred to as the "fourth field"). The subtractor circuit 5 calculates the differences of the image data of the identical pixels between the first and third fields, and the subtractor circuit 6 calculates the differences of the image data of the identical pixels between the second and fourth fields.

Figure 2:
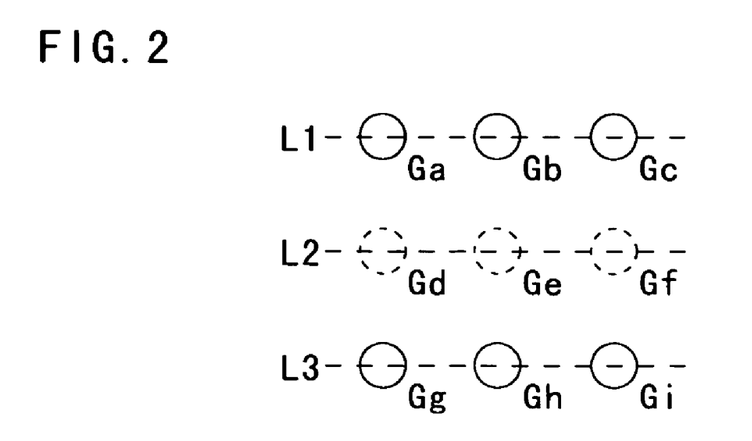
FIG. 2 is a diagram showing arrangement of pixels.

Here, the differences of the image data of the pixels between two fields are calculated for a plurality of pixels adjacent to the target pixels for which interpolation is going to be performed by an interpolation circuit (not shown) provided in the succeeding stage and that are targeted by detection of motion. Specifically, suppose that, in pixels arranged in three lines as shown in FIG. 2, the image data for the individual pixels in the central line L2 is going to be interpolated. In this case, the subtractor circuit 5 calculates the differences of the image data of the pixels in lines L1 and L3, i.e. those immediately above and below line L2, between the first and third fields, and the subtractor circuit 6 calculates the differences of the image data of the pixels in line L2 between the second and fourth fields.

The differences between the first and third fields calculated by the subtractor circuit 5 and the differences between the second and fourth fields calculated by the subtractor circuit 6 are fed to the absolute value calculator circuits 7 and 8, respectively, which then calculate the absolute values of those differences between the first and third fields and between the second and fourth fields. Thus, when pixels Ga to Gi are arranged in three lines as shown in FIG. 2, the absolute value calculator circuit 7 calculates the absolute values of the differences of the image data of the pixels Ga, Gb, and Gc in line L1 and the pixels Gg, Gh, and Gi in line L3 between the first and third fields, and the absolute value calculator circuit 8 calculates the absolute values of the differences of the image data of the pixels Gd, Ge, and Gf in line L2 between the second and fourth fields.

Let the image data of the pixels Ga to Gc and Gg to Gi in the first field be ga1 to gc1 and gg1 to gi1, let the image data of the pixels Ga to Gc and Gg to Gi in the third field be ga3 to gc3 and gg3 to gi3, let the image data of the pixels Gd to Gf in the second field be gd2 to gfc, and let the image data of the pixels Gd to Gf in the fourth field be gd4 to gf4. Then, when the subtractor circuit 6 and the absolute value calculator circuit 8 calculate the absolute value $|gd2-gd4|$ of the difference of the image data of the pixel Gd between the second and fourth fields, the subtractor circuit 5 and the absolute value calculator circuit 7 calculate the absolute values $|ga1-ga3|$ and $|gg1-gg3|$ of the differences of the image data of the pixels Ga and Gg between the first and third fields.

Similarly, when the subtractor circuit 6 and the absolute value calculator circuit 8 calculate the absolute value $|ge2-ge4|$ of the difference of the image data of the pixel Ge between the second and fourth fields, the subtractor circuit 5 and the absolute value calculator circuit 7 calculate the absolute values $|gb1-gb3|$ and $|gh1-gh3|$ of the differences of the image data of the pixels Gb and Gh between the first and third fields. Similarly, when the subtractor circuit 6 and the absolute value calculator circuit 8 calculate the absolute value $|gf2-gf4|$ of the difference of the image data of the pixel Gf between the second and fourth fields, the subtractor circuit 5 and the absolute value calculator circuit 7 calculate the absolute values $|gc1-gc3|$ and $|gi1-gi3|$ of the differences of the image data of the pixels Gc and Gi between the first and third fields.

When the subtractor circuits 5 and 6 and the absolute value calculator circuits 7 and 8 calculate the differences of the image data of the individual pixels between two fields in this way, the threshold value control circuit 11 sets, on the basis of the image data of the first field fed from the field memory 1, threshold values, one for each pixel, to be used by the comparator circuits 9 and 10. Here, first, for each of the pixels in the target pixel line L2, the absolute value of the difference of the image data between the two pixels in lines L1 and L3 that are located immediately above and below line L2 in which that pixel lies is calculated in the first field, and then, on the thus calculated absolute value of the difference, the threshold value for that pixel to be fed to the comparator circuits 9 and 10 is set.

Specifically, the threshold value to be fed to the comparator circuits 9 and 10 is set, when the pixel Gd is currently being targeted, on the basis of the absolute value $|ga1-gg1|$ of the difference of the image data between the pixels Ga and Gg in the first field, and, when the pixel Ge is currently being targeted, on the basis of the absolute value $|gb1-gh1|$ of the difference of the image data between the pixels Gb and Gh in the first field, and, when the pixel Gf is currently being targeted, on the basis of the absolute value $|gc1-gi1|$ of the difference of the image data between the pixels Gc and Gi in the first field.

Figure 3:
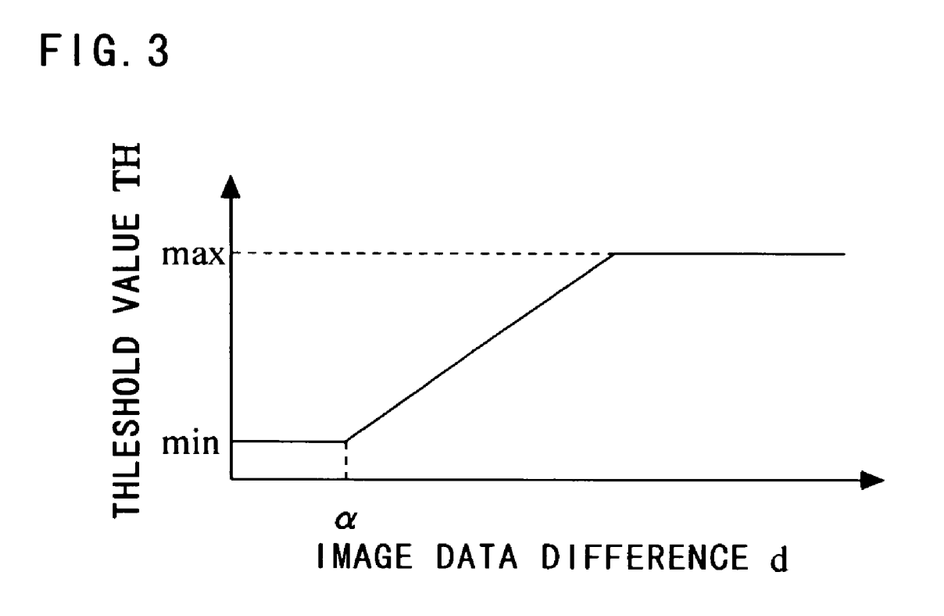
FIG. 3 is a graph showing the relation between the threshold value and the line-to-line difference in image data.

When the threshold values are set in this way, let the absolute value of the difference of the image data between the two pixels immediately above and below the currently targeted pixel be d, then the threshold value TH for the currently targeted pixel is calculated from this absolute value d of the difference on the basis of a relation as shown in a graph in FIG. 3. Specifically, the threshold value TH and the absolute value d have the relation given by equation (1) below. Here, min, max, and α represent constants.

$$TH = \min + (d-\alpha) \text{ (where } \min \leq TH \leq \max) \tag{1}$$

Hence, when the pixel Ge is currently being targeted, first, the threshold value control circuit 11 calculates the absolute value $|gb1-gh1|$ of the difference of the image data between the pixels Gb and Gh in the first field as fed from the field memory 1. Then, on the basis of equation (1) above, the threshold value TH is calculated. Specifically, the threshold value TH is given as follows. Here, $\beta=\max-\min+\alpha$.

when $|gb1-gh1| \leq \alpha$, $TH=\min$ when $\alpha<|gb1-gh1|<\beta$, $TH=\min+(|gb1-gh1|-\alpha)$ when $|gb1-gh1| \geq \beta$, $TH=\max$ The threshold value TH thus calculated is fed to the comparator circuits 9 and 10, which compare it with the outputs from the absolute value calculator circuits 7 and 8, respectively. If the output from the absolute value calculator circuit 7 or 8 is greater than the threshold value TH, the comparator circuit 9 or 10 recognizes motion, and outputs a "1" as a motion indicator value; if the output from the absolute value calculator circuit 7 or 8 is smaller than the threshold value TH, the comparator circuit 9 or 10 recognizes no motion, and outputs a "0" as a motion indicator value.

Specifically, when the pixel Ge is currently being targeted, the absolute values |gb1-gb3| and |gh1-gh3| of the differences of the image data of the pixels Gb and Gh between the first and third fields as output from the absolute value calculator circuit 7 are each compared with the threshold value TH fed from the threshold value control circuit 11 in the comparator circuit 9, which then outputs motion indicator values. On the other hand, the absolute value |ge2-ge4| of the difference of the image data of the pixel Ge between the second and fourth fields as output from the absolute value calculator circuit 8 is compared with the threshold value TH fed from the threshold value control circuit 11 in the comparator circuit 10, which then outputs a motion indicator value.

When the comparator circuits 9 and 10 output pixel-by-pixel motion indicator values to the adder circuit 12, the adder circuit 12 adds together the motion indicator values of the currently targeted pixel and of a plurality of pixels located nearby with different weights assigned thereto. Here, the weights are assigned in such a way that, with the currently targeted pixel at the center, the motion indicator value of the currently targeted pixel is assigned the heaviest weight (the highest weight factor), and the motion indicator values of the other pixels are assigned lighter and lighter weights (increasingly lower weight factors) the farther away they are from the currently targeted pixel. In the embodiment under discussion, for each pixel targeted by detection of motion, the motion indicator values of nine pixels, with the targeted pixel at the center, are added together with weights added thereto.

Specifically, in FIG. 2, when the pixel Ge is currently being targeted, the motion indicator values A to C and G to I of the pixels Ga to Gc and Gg to Gi fed from the comparator circuit 9 and the motion indicator values D to F of the pixels Gd to Gf fed from the comparator circuit 10 are added together by the adder circuit 12, with weights assigned thereto as given by equation (2) below, to calculate a motion sum level m. Here, ka to kf represent the weight factors.

$$m = ka \times A + kb \times B + kc \times C + kd \times D + ke \times E + kf \times F + kg \times G + kh \times H + ki \times I \quad (2)$$

When the motion sum level m is calculated in this way, the weight factors are set, for example, as follows: ka=1, kb=2, kc=1, kd=2, ke=4, kf=2, kg=1, kh=2, and ki=1. That is, the weight factors are determined so as to satisfy the relation $$ka = kc = kg = ki \leq kb = kd = kf = kh \leq ke$$

In cases where the adder circuit 12 adds together a larger number of motion indicator values with weights assigned thereto, the weight factors may be determined in one of the manners described below. The three examples described below deal with how the weight factors are determined when motion indicator values are added together with weights assigned thereto for (2m-1)×(2n-1) pixels in total, i.e. horizontally 2m-1 by vertically 2n-1 pixels (or pixels arranged in 2n-1 lines each containing 2m-1 pixels), with the targeted pixel at the center.

1. First Example of How the Weight Factors are Determined

Let the 2n-1 lines be called, from the top, line $L_1$, $L_2, \ldots, L_{2n-1}$. Then, the weight factors with which to multiply the motion indicator values obtained from the pixels arranged in lines $L_1$ and $L_{2n-1}$ are determined to be, in order of increasing distance from the target pixel arranged in line $L_n$, m, m-1, m-2, ..., 1. That is, the weight factors with which to multiply the motion indicator values obtained from the pixels arranged in lines $L_1$ and $L_{2n-1}$ are determined to be, from the left, 1, 2, ..., m-1, m, m-1, ..., 2, 1.

The weight factors with which to multiply the motion indicator values obtained from the pixels arranged in lines $L_2$, $L_{2n-2}$, i.e. the lines vertically one pixel nearer to the target pixel, are determined to be 2, 3, ..., m, m+1, m, ..., 3, 2, i.e. by adding 1 to the weight factors with which to multiply the motion indicator values obtained from the pixels arranged in lines $L_1$ and $L_{2n-1}$, respectively. The weight factors with which to multiply the motion indicator values obtained from the pixels arranged in lines $L_3$, $L_{2n-3}$, i.e. the lines vertically one pixel further nearer to the target pixel, are determined to be 3, 4, ..., m+1, m+2, m+1, ..., 4, 3, i.e. by adding 1 to the weight factors with which to multiply the motion indicator values obtained from the pixels arranged in lines $L_2$ and $L_{2n-2}$, respectively. The weight factors with which to multiply the motion indicator values obtained from the pixels arranged in line Ln in which the target pixel is arranged are determined to be n, n+1, ..., m+n-2, m+n-1, m+n-2, ..., n+1, n.

In this way, the weight factors by which to multiply the motion indicator values obtained from the pixels located in a line one pixel nearer to the pixel currently targeted for detection of motion respectively have values greater by one than the weight factors by which to multiply the motion indicator values obtained from the pixels located in a line one pixel farther than that line from the targeted pixel.

Thus, the weight factors by which to multiply the motion indicator values obtained from the pixels arranged in the first, or (2m-1)th, column from the left are determined to be, from the top, 1, 2, ..., n-1, n, n-1, ..., 2, 1. The weight factors by which to multiply the motion indicator values obtained from the pixels arranged in the second, or (2m-2)th, column from the left are determined to be, from the top, 2, 3, ..., n, n+1, n, ..., 3, 2, i.e. by adding 1 to the weight factors by which to multiply the motion indicator values obtained from the pixels arranged in the first, or (2m-1)th, column from the left. The weight factors by which to multiply the motion indicator values obtained from the pixels arranged in the third, or (2m-3)th, column from the left are determined to be, from the top, 3, 4, ..., n+1, n+2, n+1, ..., 4, 3, i.e. by adding 1 to the weight factors by which to multiply the motion indicator values obtained from the pixels arranged in the second, or (2m-2)th, column from the left. The weight factors with which to multiply the motion indicator values obtained from the pixels arranged in the mth column in which the target pixel is arranged are determined to be, from the top, m, m+1, . . . , m+n−2, m+n−1, m+n−2, . . . m+1, m.

2. Second Example of How the Weight Factors are Determined

Let the 2n−1 lines be called, from the top, line $L_1$, $L_2$, . . . $L_{2n-1}$. Then, the weight factors with which to multiply the motion indicator values obtained from the pixels arranged in lines $L_1$ and $L_{2n-1}$ are determined to be, in order of increasing distance from the target pixel arranged in line $L_n$, m, m−1, m−2, . . . , 1. That is, the weight factors with which to multiply the motion indicator values obtained from the pixels arranged in lines $L_1$ and $L_{2n-1}$ are determined to be, from the left, 1, 2, . . . , m−1, m, m−1, . . . , 2, 1.

The weight factors with which to multiply the motion indicator values obtained from the pixels arranged in lines $L_2$, $L_{2n-2}$, i.e. the lines vertically one pixel nearer to the target pixel, are determined to be 2, 4, . . . , 2×(m−1),2×m, 2×(m−1), . . . , 4, 2, i.e. by multiplying by 2 the weight factors with which to multiply the motion indicator values obtained from the pixels arranged in lines $L_1$ and $L_{2n}$, respectively. The weight factors with which to multiply the motion indicator values obtained from the pixels arranged in lines $L_3$, $L_{2n-3}$, i.e. the lines vertically one pixel further nearer to the target pixel, are determined to be 4, 8, . . . , 4×(m−1),4×m,4×(m−1), . . . , 8, 4, i.e. by multiplying by 2 the weight factors with which to multiply the motion indicator values obtained from the pixels arranged in lines $L_2$ and $L_{2n-2}$, respectively. The weight factors with which to multiply the motion indicator values obtained from the pixels arranged in line Ln in which the target pixel is arranged are determined to be $2^{n-1}$, $2^{n-1}\times2$, . . . , $2^{n-1}\times(m-1)$, $2^{n-1}\times m$, $2^{n-1}\times(m-1)$, . . . , $2^{n-1}\times2$, $2^{n-1}$.

In this way, the weight factors by which to multiply the motion indicator values obtained from the pixels located in a line one pixel nearer to the pixel currently targeted for detection of motion respectively have values twice the weight factors by which to multiply the motion indicator values obtained from the pixels located in a line one pixel farther than that line from the targeted pixel.

Thus, the weight factors by which to multiply the motion indicator values obtained from the pixels arranged in the first, or (2m−1)th, column from the left are determined to be, from the top, 1, 2, . . . , $2^{n-2}$, $2^{n-1}$, $2^{n-2}$, . . . , 2, 1. The weight factors by which to multiply the motion indicator values obtained from the pixels arranged in the second, or (2m−2)th, column from the left are determined to be, from the top, 2, 4, . . . , $2^{n-2}\times2$, $2^{n-1}\times2$, $2^{n-2}\times2$, . . . , 4, 2. The weight factors by which to multiply the motion indicator values obtained from the pixels arranged in the third, or (2m−3)th, column from the left are determined to be, from the top, 3, 6, . . . , $2^{n-2}\times3$, $2^{n-1}\times3$, $2^{n-2}\times3$, . . . , 6, 3. The weight factors with which to multiply the motion indicator values obtained from the pixels arranged in the mth column in which the target pixel is arranged are determined to be, from the top, m, 2×m, . . . , $2^{n-2}\times m$, $2^{n-1}\times m$, $2^{n-2}\times m$, . . . , 2×m, m.

3. Second Example of How the Weight Factors are Determined

Let the 2n−1 lines be called, from the top, line $L_1$, $L_2$, . . . , $L_{2n-1}$. Then, the weight factors with which to multiply the motion indicator values obtained from the pixels arranged in lines $L_1$ and $L_{2n-1}$ are determined to be, in order of increasing distance from the target pixel arranged in line $L_n$, $2^{m-1}$, $2^{m-2}$, $2^{m-3}$, . . . , 1. That is, the weight factors with which to multiply the motion indicator values obtained from the pixels arranged in lines $L_1$ and $L_{2n-1}$ are determined to be, from the left, 1, 2, . . . , $2^{m-2}$, $2^{m-1}$, $2^{m-2}$, . . . , 2, 1.

The weight factors with which to multiply the motion indicator values obtained from the pixels arranged in lines $L_2$, $L_{2n-2}$, i.e. the lines vertically one pixel nearer to the target pixel, are determined to be 2, 4, . . . , $2^{m-1}$, $2^m$, $2^{m-1}$, . . . , 4, 2, i.e. by multiplying by 2 the weight factors with which to multiply the motion indicator values obtained from the pixels arranged in lines $L_1$ and $L_{2n-1}$, respectively. The weight factors with which to multiply the motion indicator values obtained from the pixels arranged in lines $L_3$, $L_{2n-3}$, i.e. the lines vertically one pixel further nearer to the target pixel, are determined to be 4, 8, . . . , $2^m$, $2^{m+1}$, $2^m$, . . . , 8, 4, i.e. by multiplying by 2 the weight factors with which to multiply the motion indicator values obtained from the pixels arranged in lines $L_2$ and $L_{2n-2}$, respectively. The weight factors with which to multiply the motion indicator values obtained from the pixels arranged in line Ln in which the target pixel is arranged are determined to be $2^{n-1}$, $2^n$, . . . , $2^{m+n-3}$, $2^{m+n-2}$, $2^{m+n-3}$, . . . , $2^n$, $2^{n-1}$.

In this way, the weight factors by which to multiply the motion indicator values obtained from the pixels located in a line one pixel nearer to the pixel currently targeted for detection of motion respectively have values twice the weight factors by which to multiply the motion indicator values obtained from the pixels located in a line one pixel farther than that line from the targeted pixel.

Thus, the weight factors by which to multiply the motion indicator values obtained from the pixels arranged in the first, or (2m−1)th, column from the left are determined to be, from the top, 1, 2, . . . , $2^{n-2}$, $2^{n-1}$, $2^{n-2}$, . . . , 2, 1. The weight factors by which to multiply the motion indicator values obtained from the pixels arranged in the second, or (2m−2)th, column from the left are determined to be, from the top, 2, 4, . . . , $2^{n-1}$, $2^n$, $2^{n-1}$, . . . , 4, 2, i.e. by multiplying by 2 the weight factors by which to multiply the motion indicator values obtained from the pixels arranged in the first, or (2m−1)th, column from the left. The weight factors by which to multiply the motion indicator values obtained from the pixels arranged in the third, or (2m−3)th, column from the left are determined to be, from the top, 4, 8, . . . , $2^n$, $2^{n+1}$, $2^n$, . . . , 8, 4, i.e. by multiplying by 2 the weight factors by which to multiply the motion indicator values obtained from the pixels arranged in the second, or (2m−2)th, column from the left. The weight factors with which to multiply the motion indicator values obtained from the pixels arranged in the mth column in which the target pixel is arranged are determined to be, from the top, $2^{m-1}$, $2^m$, . . . , $2^{m+n-3}$, $2^{m+n-2}$, $2^{m+n-3}$, . . . , $2^m$, $2^{m-1}$.

The weight factors thus determined are assigned to the motor indicator values obtained from the individual pixels when they are added together in the adder circuit 12, which thereby calculates the motion sum level m and feeds it to the motion detecting circuit 13. The motion detecting circuit 13, recognizing larger motion the greater the motion sum level m fed thereto from the adder circuit 12 is, outputs motion detection results. For example, in cases where an interpolation circuit (not shown) provided in the succeeding stage interpolates the image data for given pixels by adding together image data obtained by spatial interpolation (interpolation between lines) and image data obtained by temporal interpolation (interpolation between fields) with weight factors assigned thereto, these weight factors can be varied according to the motion detection results output from the motion detecting circuit 13.

The motion detecting circuit 13 may be so configured as to output different motion detection results according to whether (1) m<sum1, (2) sum1≦m<sum2, (3) sum2≦m<sum3, (4) sum3≦m<sum4, or (5) sum4≦m. Here, suppose that, in an interpolation circuit provided in the succeeding stage, the image data g that is going to be interpolated for a given pixel is generated by adding together image data g1 obtained by temporal interpolation and image data g2 obtained by spatial interpolation with weights assigned thereto.

Then, assuming that the motion detection results are output in five steps as described above, the weight factors x and y in the formula g=x×g1+y×g2 used to calculate the image data g by weighted addition are varied, for example, in the following manner:

(1) when m<sum1, (x, y)=(1, 0)
(2) when sum1≦m<sum2, (x, y)=(¾, ¼)
(3) when sum2≦m<sum3, (x, y)=(½, ½)
(4) when sum3≦m<sum4, (x, y)=(¼, ¾)
(5) when sum4≦m, (x, y)=(0, 1)

Second Embodiment

Figure 4:
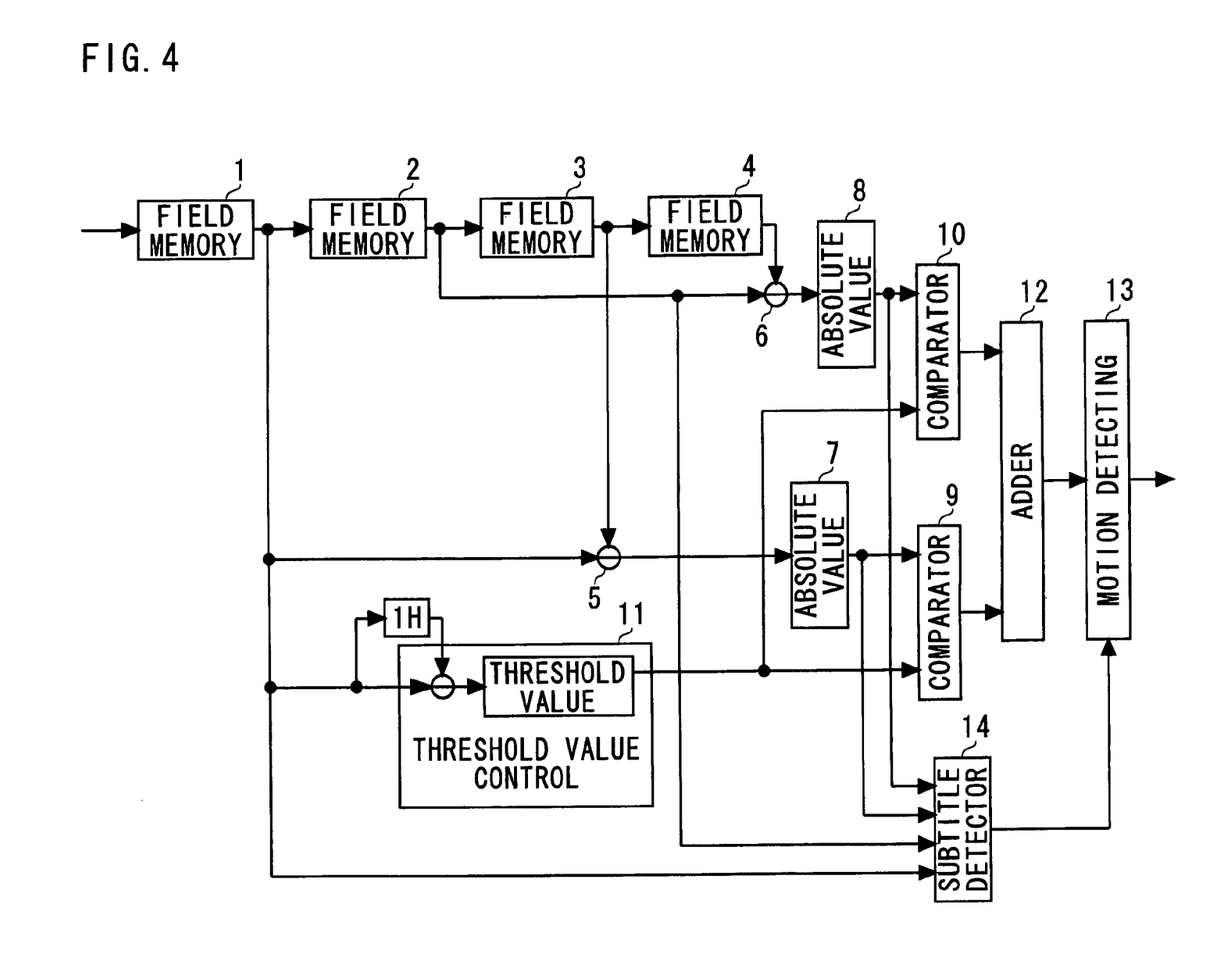
FIG. 4 is a block diagram showing the internal configuration of the motion detecting device of a second embodiment of the invention.

A second embodiment of the present invention will be described below with reference to the drawings. FIG. 4 is a block diagram showing the internal configuration of the motion detecting device of this embodiment. In the motion detecting device shown in FIG. 4, such circuit blocks as serve the same purposes as in the motion detecting device shown in FIG. 1 are identified with the same reference numerals, and their detailed explanations will not be repeated.

The motion detecting device of this embodiment is obtained by additionally providing a subtitle detector circuit 14 in the motion detecting device of the first embodiment (FIG. 1). Specifically, on the basis of the outputs from the field memories 1 and 2 and the absolute value calculator circuits 7 and 8, whether the currently targeted pixel is involved in displaying a subtitle (caption) or not is checked, and the detection result is output to the motion detecting circuit 13. In the motion detecting device configured in this way, the subtractor circuits 5 and 6, the absolute value calculator circuits 7 and 8, the comparator circuits 9 and 10, the threshold value control circuit 11, and the adder circuit 12 operate in the same manner as described earlier in connection with the first embodiment, and therefore their detailed explanations will not be repeated. In the following descriptions, the operation of the subtitle detector circuit 14 and the motion detecting circuit 13, which operate differently than in the first embodiment, will be explained.

In the first embodiment, the threshold value control circuit 11 sets the threshold value for the target pixel on the basis of the difference of the image data between the pixels immediately above and below the target pixel in the first field. Here, setting the threshold value in such a way that, the smaller the absolute value of the difference of the image data, the smaller the threshold value permits the motion detecting circuit 13 to detect motion more easily. Now, suppose that, in nine pixels arranged as shown in FIG. 2, a subtitle is displayed in lines L1 and L2. In this case, when the pixel Ge is currently being targeted, if the absolute value |gb1−gh| of the difference of the image data between the pixels Gb and Gh is small and the motion detection result output from the adder circuit 12 is great, the motion detecting circuit 13 may erroneously recognize motion at the pixel Ge.

To avoid this, the subtitle detector circuit 14 checks whether the target pixel is involved in displaying a subtitle or not on the basis of the image data of the two pixels immediately above and below the target pixel in the first field, the image data of the target pixel in the second field, the differences of the image data of the two pixels immediately above and below the target pixel between the first and third fields, and the difference of the image data of the target pixel between the second and fourth fields. Now, how the subtitle detector circuit 14 checks whether the image data of the target pixel is part of the data of a subtitle or not will be described.

When the pixel Ge shown in FIG. 2 is currently being targeted, the subtitle detector circuit 14 receives the image data gb1 and gh1 of the pixels Gb and Gh in the first field from the field memory 1 and the image data ge2 of the pixel Ge in the second field from the field memory 2. Then, the subtitle detector circuit 14 calculates the absolute value |gb1−ge2| of the difference between the image data gb1 of the pixel Gb and the image data ge2 of the pixel Ge and the absolute value |gh1−ge2| of the difference between the image data gh1 of the pixel Gh and the image data ge2 of the pixel Ge. At this point, the subtitle detector circuit 14 receives the absolute values |gb1−gb3| and |gh1−gh3| of the differences of the image data of the pixels Gb and Gh between the first and third fields from the absolute value calculator circuit 7 and the absolute value |ge2−ge4| of the difference of the image data of the pixel Ge between the second and fourth fields from the absolute value calculator circuit 8.

Then, detection of a subtitle is performed on the basis of the field-to-field differences |gb1−gb3|, |ge2−ge4|, and |gh1−gh3| and the line-to-line differences |gb1−ge2| and |gh1−ge2| in image data among those pixels. Here, the field-to-field differences are compared with a threshold value TH1, and the line-to-line differences are compared with a threshold value TH2. Then, on the basis of the comparison results, whether the pixel Ge is involved in displaying a subtitle or not is checked. Specifically, (1) when |gb1−gb3|<TH1, and |ge2−ge4|<TH1, and |gb1−ge2|<TH2, or (2) when |ge2−ge4|<TH1, and |gh1−gh3|<TH1, and |gh1−ge2|<TH2, the pixel Ge is judged to be involved in displaying a subtitle.

That is, (1) when |gb1−gb3|<TH1, and |ge2−ge4|<TH1, and |gb1−ge2|<TH2, the differences of the image data of the pixels Gb and Ge between two fields are small, and thus the motion at the pixels Gb and Ge is judged to be small. Moreover, the difference of the image data between the pixels Gb and Ge (between two lines) is small, and thus it is proper to judge that a subtitle is being displayed in lines L1 and L2. On the other hand, (2) when |ge2−ge4|<TH1, and |gh1−gh3|<TH1, and |gh1−ge2|<TH2, the differences of the image data of the pixels Ge and Gh between two fields are small, and thus the motion at the pixels Ge and Gh is judged to be small. Moreover, the difference of the image data between the pixels Ge and Gh (between two lines) is small, and thus it is proper to judge that a subtitle is being displayed in lines L2 and L3.

In this way, (1) when |gb1−gb3|<TH1, and |ge2−ge4|<TH1, and |gb1−ge2|<TH2, or (2) when |ge2−ge4|<TH1, and |gh1−gh3 |<TH1, and |gh1−ge2|<TH2, the pixel Ge is judged to be involved in displaying a subtitle, and thus the motion detecting circuit 13 forcibly judges that no motion is present at the pixel Ge. As a result, irrespective of the value of the motion sum level fed from the adder circuit 12 to the motion detecting circuit 13, the motion detecting circuit 13 outputs a motion detection result that indicates no motion at the pixel Ge. Accordingly, for example, in an interpolation circuit provided in the succeeding stage, temporal interpolation is performed for the pixel Ge so that the image data one field before is used as its image data.

In this embodiment, the data of three vertically adjacent pixels are used to check whether the target pixel at the center is involved in displaying a subtitle or not. It is also possible to additionally check relations, similar to those checked above, among the image data of a plurality of pixels horizontally adjacent to those three adjacent pixels to check whether the target pixel at the center is involved in displaying a subtitle or not.

According to the present invention, detection of motion at the first pixel is performed on the basis of the relation of image data between the second and third pixels adjacent to the first pixel. This helps reduce the probability of erroneous recognition of motion as compared with cases in which whether motion is present or not is checked solely on the basis of the relation of image data between fields. In particular, when the difference in image data between the second and third pixels is small, it is advantageous to recognize no motion. Therefore, according to the present invention, when the difference in image data between the second and third pixels is small, the threshold value is made small so that no motion is recognized at the first pixel. This makes it possible, for example, to use spatially interpolated image data with priority when the image data for the first pixel is going to be interpolated.

In addition to such detection of motion, when the field-to-field difference of the image data of the first pixel, the field-to-field difference of the image data of the second or third pixel, and the difference in image data between the first pixel and the second or third pixel are smaller than their respective threshold values, forcibly, no motion is recognized at the first pixel. This helps prevent erroneous recognition of motion when, for example, the first pixel is involved in displaying a subtitle or the like.

What is claimed is:

1. A motion detecting device comprising:
   a threshold value control circuit that determines, with respect to a first pixel for which detection of motion is going to be performed, a threshold value based on a difference of image data between a second pixel and a third pixel that are arranged in lines immediately above and below a line in which the first pixel is arranged and that are adjacent to the first pixel; and
   a motion detecting circuit that checks whether motion is present at the first pixel or not, based on results obtained by comparing a difference, between two fields, of image data of each of the first, second, and third pixels with the threshold value,
   wherein the threshold value control circuit sets the threshold value in such a way that the threshold value becomes smaller as the absolute value of the difference between the image data of the second and third pixels becomes smaller and that the threshold value becomes greater as the absolute value of the difference between the image data of the second and third pixels becomes greater,
   wherein, as image data constituting one field after another, image data of pixels arranged in even-numbered lines and image data of pixels arranged in odd-numbered lines is fed in alternately, and whether a subject is in motion or not is checked at each of pixels in those lines to which no image data is allotted in a given field, and
   wherein, to check whether the subject is in motion or not, a difference, between two fields, of image data of each of a plurality of pixels adjacent to the first pixel, including the first, second, and third pixels and having the first pixel at a center, is compared with the threshold value determined individually for those pixels, and whether motion is present at the first pixel or not is checked based on a plurality of results that the comparison yields.

2. A motion detecting device as claimed in claim 1 wherein no motion is recognized with respect to a first pixel for which detection of motion is going to be performed if an absolute value of a difference between image data of the second or third pixel arranged in a line immediately above or below a line in which the first pixel is arranged and adjacent to the first pixel and image data of the first pixel is smaller than a first threshold value, and in addition if an absolute value of a difference, between two fields, of the image data of the first pixel is smaller than a second threshold value, and in addition an absolute value of a difference, between two fields, of the image data of the second or third pixel is smaller than the second threshold value.

3. A motion detecting device comprising:
   a threshold value control circuit that sets a threshold value based on a difference between image data of a second pixel in a first field and image data of a third pixel in the first field;
   a difference calculating circuit that calculates a difference of image data of a first pixel between a second and a fourth field and differences of the image data of the second and third pixels between the first and a third field;
   a comparator circuit that compares the differences of the image data of the first, second, and third pixels calculated by the difference calculating circuit each with the threshold value set by the threshold value circuit and that recognizes motion in, among of the first, second, and third pixels, that pixel of which an absolute value of the difference of the image data is greater than the threshold value; and
   a detecting circuit that checks whether motion is present at the first pixel or not based on comparison results fed from the comparator circuit with respect to a plurality of pixels near the first pixel including the first, second, and third pixels,
   wherein, as image data constituting one field after another, image data of pixels arranged in the even-numbered lines and image data of pixels arranged in the odd-numbered lines is fed in alternately, and whether a subject is in motion or not is checked at each of pixels to which no image data is allotted in a given field,
   wherein, of the even-numbered and odd-numbered lines, lines in which pixels for which detection of motion is going to be performed are arranged are called first lines and lines in which pixels to which image data is allocated are arranged are called second lines,
   wherein a field in which the detection of motion is going to be performed is called the first field, a field fed in one field before the first field is called the second field, a field fed in two fields before the first field is called the third field, and a field fed in three fields before the first field is called the fourth field, and
   wherein a pixel that is located in the first line and that is currently being targeted by the detection of motion is called the first pixel, and pixels that are located in a same column as the first pixel and in the second lines so as to be adjacent to the first pixel are called the second and the third pixel,
   wherein the threshold value control circuit sets the threshold value in such a way that the threshold value becomes smaller as the absolute value of the difference between the image data of the second and third pixels becomes smaller and the threshold value becomes greater as the absolute value of the difference between the image data of the second and third pixels becomes greater.

4. A motion detecting device as claimed in claim 3, wherein when the difference between the image data of the first pixel in the second field and the image data of the second pixel in the first field is smaller than a first threshold value, and in addition the difference of the image data of the first pixel between the second and fourth fields is smaller than a second threshold value, and in addition the difference of the image data of the second pixel between the first and third fields is smaller than the second threshold value, or when the difference between the image data of the first pixel in the second field and the image data of the third pixel in the first field is smaller than the first threshold value, and in addition the difference of the image data of the first pixel between the second and fourth fields is smaller than the second threshold value, and in addition the difference of the image data of the third pixel between the first and third fields is smaller than the second threshold value, no motion is recognized at the first pixel irrespective of the comparison results output from the comparator circuit.

5. A motion detecting device comprising:

assuming that, of the even-numbered and odd-numbered lines, lines in which pixels for which detection of motion is going to be performed are arranged are called first lines, and lines in which pixels to which image data is allocated are arranged are called second lines, that a field in which the detection of motion is going to be performed is called a first field, a field fed in one field before the first field is called a second field, a field fed in two fields before the first field is called a third field, and a field fed in three fields before the first field is called a fourth field, and that a pixel that is located in the first line and that is currently being targeted by the detection of motion is called a first pixel, and pixels that are located in a same column as the first pixel and in the second lines so as to be adjacent to the first pixel are called a second and a third pixel, a threshold value control circuit that sets a threshold value based on a difference between image data of the second pixel in the first field and image data of the third pixel in the first field;

a difference calculating circuit that calculates a difference of image data of the first pixel between the second and fourth fields and differences of the image data of the second and third pixels between the first and third fields;

a comparator circuit that compares the differences of the image data of the first, second, and third pixels calculated by the difference calculating circuit each with the threshold value set by the threshold value control circuit and that recognizes motion in, among of the first, second, and third pixels, that pixel of which an absolute value of the difference of the image data is greater than the threshold value; and a detecting circuit that checks whether motion is present at the first pixel or not, based on comparison results fed from the comparator circuit with respect to a plurality of pixels near the first pixel including the first, second, and third pixels, wherein the comparator circuit comprises:

a first comparator circuit that compares an absolute value of the difference of the image data of the first pixel between the second and fourth fields with the threshold value and that, when the absolute value of the difference of the image data of the first pixel is greater than the threshold value, outputs a "1" as a comparison result and, when the absolute value of the difference of the image data of the first pixel is smaller than the threshold value, outputs a "0" as a comparison result;

a second comparator circuit that compares an absolute value of the difference of the image data of the second pixel between the first and third fields with the threshold value and that, when the absolute value of the difference of the image data of the second pixel is greater than the threshold value, outputs a "1" as a comparison result and, when the absolute value of the difference of the image data of the second pixel is smaller than the threshold value, outputs a "0" as a comparison result;

a third comparator circuit that compares an absolute value of the difference of the image data of the third pixel between the first and third fields with the threshold value and that, when the absolute value of the difference of the image data of the third pixel is greater than the threshold value, outputs a "1" as a comparison result and, when the absolute value of the difference of the image data of the third pixel is smaller than the threshold value, outputs a "0" as a comparison result, wherein the detecting circuit performs weighted addition on a plurality of comparison results output consecutively from each of the first, second, and third comparator circuits by adding them together with weight factors assigned thereto, and motion is recognized at the first pixel when the weighted addition yields a great sum.

6. A motion detecting device as claimed in claim 5, wherein, when the detecting circuit performs the weighted addition, weight factors by which to multiply comparison results output from the comparator circuit with respect to the plurality of pixels near the first pixel including the first, second, and third pixels are determined in such a way that, the farther away pixels are from the first pixel, the lower the weight factors assigned thereto.

7. A motion detecting device comprising:

assuming that, of the even-numbered and odd-numbered lines, lines in which pixels for which detection of motion is going to be performed are arranged are called first lines and lines in which pixels to which image data is allocated are arranged are called second lines, that a field in which the detection of motion is going to be performed is called a first field, a field fed in one field before the first field is called a second field, a field fed in two fields before the first field is called a third field, and a field fed in three fields before the first field is called a fourth field, and that a pixel that is located in the first line and that is currently being targeted by the detection of motion is called a first pixel, and pixels that are located in a same column as the first pixel and in the second lines so as to be adjacent to the first pixel are called a second and a third pixel, a threshold value control circuit that sets a threshold value based on a difference between image data of the second pixel in the first field and image data of the third pixel in the first field;

a difference calculating circuit that calculates a difference of image data of the first pixel between the second and fourth fields and differences of the image data of the second and third pixels between the first and third fields;

a comparator circuit that compares the differences of the image data of the first, second, and third pixels calculated by the difference calculating circuit each with the threshold value set by the threshold value control circuit and that recognizes motion in, among of the first, second, and third pixels, that pixel of which an absolute value of the difference of the image data is greater than the threshold value; and a detecting circuit that checks whether motion is present at the first pixel or not, based on comparison results fed from the comparator circuit with respect to a plurality of pixels near the first pixel including the first, second, and third pixels, wherein, as image data constituting one field after another, image data of pixels arranged in the even-numbered lines and image data of pixels arranged in the odd-numbered lines is fed in alternately, and whether a subject is in motion or not is checked at each of pixels in those lines to which no image data is allotted in a given field, and wherein the absolute value of the difference between the image data of the second and third pixels is d, and the threshold value is TH, the threshold value control circuit sets the threshold value in such a way that the threshold value TH and the absolute value d of the difference of the image data between those pixels satisfy the following relation:

$TH = \min + (d - \alpha)$ where $\min \leq TH \leq \max$, and min, max and $\alpha$ represent constants.

* * * * *